(12) United States Patent
Utaki (10) Patent No.: US 7,150,206 B2
(45) Date of Patent: Dec. 19, 2006

(54) CABLE OR THE LIKE PROTECTION AND GUIDE DEVICE

(75) Inventor: Akihiko Utaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 222 days.

(21) Appl. No.: 10/871,444

(22) Filed: Jun. 19, 2004

(65) Prior Publication Data

US 2005/0056114 A1 Mar. 17, 2005

(30) Foreign Application Priority Data

Sep. 11, 2003 (JP) .............................. 2003-320321

(51) Int. Cl.
*F16C 1/22* (2006.01)
*F16C 1/26* (2006.01)
*H01H 17/08* (2006.01)
*F16G 13/00* (2006.01)
*F16L 11/00* (2006.01)

(52) U.S. Cl. ...................... 74/502.6; 59/78.1; 138/120; 174/138 B (58) Field of Classification Search ............... 74/502.6; 174/138 B; 138/120; 59/78.1; H02G 11/00
See application file for complete search history.

(56) References Cited

U.S. PATENT DOCUMENTS 5,038,556 A * 8/1991 Moritz et al. ................ 59/78.1
5,724,803 A * 3/1998 Pea ............................. 59/78.1
6,016,844 A * 1/2000 Takahashi et al. ........... 138/120
6,688,096 B1 * 2/2004 Wada et al. .................. 59/78.1
6,992,254 B1 * 1/2006 Komiya .................... 174/138 B

FOREIGN PATENT DOCUMENTS

EP       1 463 176 A1 *   9/2004
JP       P3157491          2/2001

* cited by examiner

*Primary Examiner*—Vinh T. Luong
(74) *Attorney, Agent, or Firm*—Woodling, Krost and Rust (57) ABSTRACT

To provide a cable or the like protection and guide device, which reliably maintains linear position mode of the adjacent connecting link bodies without backlash to remove distortion and can attain a smooth change of form between the linear position mode and the bending position mode, and also can exert endurance due to the connecting pin and the pin connecting hole for a long period of time. A position limiting concave portion 110*a* of a side plate 110, which connects link bodies 100 on the front and rear sides of a cable or the like protection and guide device 100 includes a pair of abutting surfaces 111, 111 disposed in parallel with a reference line passing through bending center points of connecting pins 130 disposed on the front and rear sides of the link body 100, and a position limiting convex portion 110*b* of the side plate 110 includes a pair of linear position limiting surfaces 112, 112 disposed in parallel with each other in a plane symmetry with respect to the bending center point. Accordingly, bending of the linear position mode can be removed.

4 Claims, 6 Drawing Sheets

CABLE OR THE LIKE PROTECTION AND GUIDE DEVICE

TECHNICAL FIELD

The present invention relates to a cable or the like protection and guide device, and more specifically relates to a cable or the like protection and guide device, which accommodates a cable or the like such as a cable or a hose, which supplies energy such as electric power, compressed air to a movable portion of an industrial machine, and is suitable for stably and reliably protect and guide the cable or the like even during the movement of the movable portion.

BACKGROUND TECHNOLOGY

Figure 11:
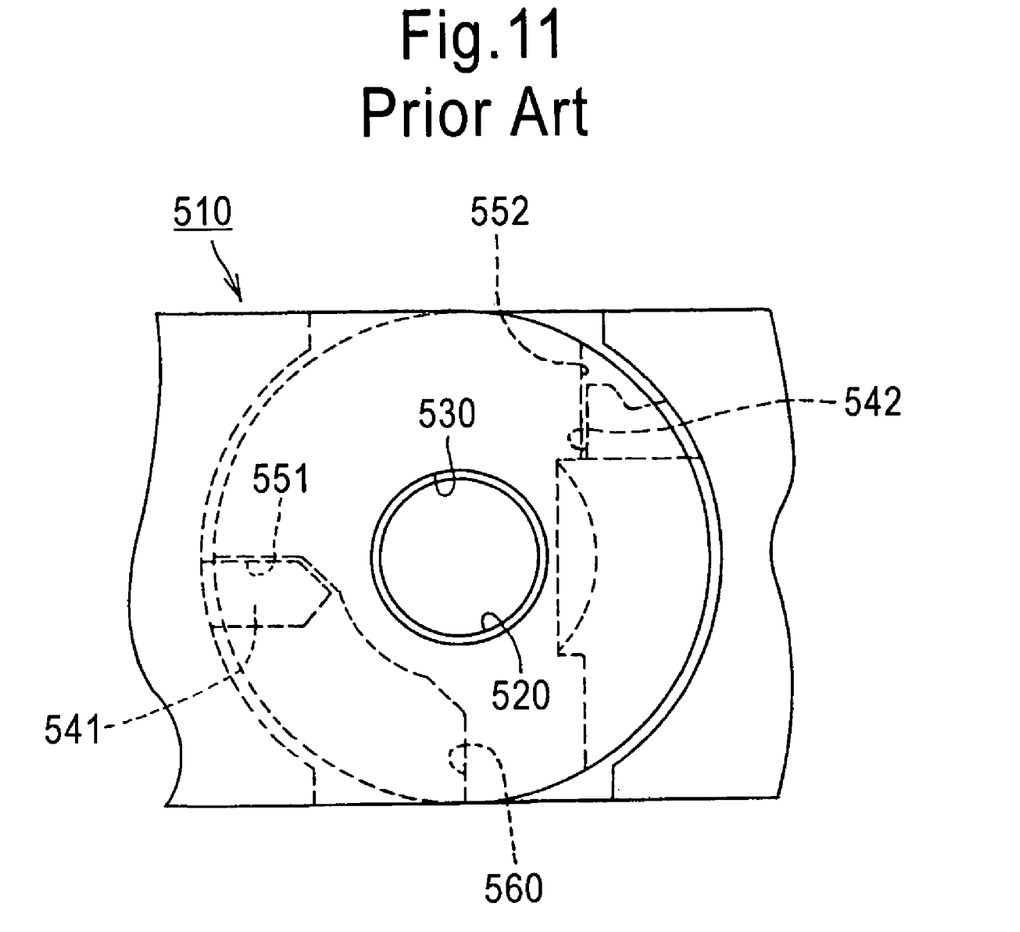
FIG. 11 is an explanatory view of a guide and support chain, which is a prior art.

As an example of a cable or the like protection and guide device, for example as shown in FIG. 11, there is conventionally known a guide and support chain, having synthetic resin link bodies in which connecting rods are laterally bridged at an upper edge and a lower edge of a pair of right and left side plates 510, 510, in which the side plates 510, 510 of the link bodies are rotatably connected to each other on the front and rear sides through a connecting pin 520 and a pin connecting hole 530 while they are overlapped in the plate thickness direction, an accommodating space for a cable or the like is formed in a plurality of connected link bodies and the front and rear link bodies can be mutually changed in their forms from the linear position mode to the bending position mode or from the bending position mode to the linear position mode (refer to Patent Reference 1).

Particularly, in such a guide and support chain, a linear position maintaining stopper 541 and a linear position maintaining stopper 542, which maintain the linear position mode of link bodies are formed on one of side plates 510 connected on the front and rear sides, and a linear position maintaining stopper 551, which abuts on said linear position maintaining stopper 541, and a linear position maintaining stopper 552, which abuts on said linear position maintaining stopper 542, are formed on the other side plate 510 connected on the front and rear sides. Further, on one side plate 510 is formed an opposite surface of the linear position limiting stopper 541, which limits the bending position mode of the link bodies, and on the other side plate 510 is formed a bending position limiting stopper surface 560, which abuts on the opposite surface of the linear position limiting stopper 541.

And such a guide and support chain resists against a load of bending stress F, which is generated during maintaining the linear position mode in abutting conditions between the linear position maintaining stoppers 541, 542 and the linear position maintaining stoppers 551, 552, respectively and in slack-fitted conditions between the connecting pin 520 and the connecting hole 530, that is in three-points supporting conditions. Further, the guide and support chain resists against an excessive bending movement, which is liable to occur, in abutting conditions between the opposite surface of the linear position maintaining stopper 541 and the bending position limiting stopper 560 and in slack-fitted conditions between the connecting pin 520 and the connecting hole 530, that is in two-points supporting conditions.

Patent Reference 1: Specification of Japanese Patent No. 3157491 (on page 1, FIG. 2).

Problems to be Solved by the Invention

However, in the conventional protection and guide chain disclosed in the above-mentioned specification of Japanese patent No. 3157491, the linear position mode is maintained in three-points supporting conditions and the bending position mode is maintained in two-points supporting conditions. Thus, between the connecting pin 520 and the pin connecting hole 530 is generated an excess load for maintaining position except for rotation, which is sufficient if only a connecting function and a bending rotation function of the adjacent link bodies are exerted. Accordingly, the conventional guide and support chain is easy to wear at an early stage. When wear between the connecting pin 520 and the pin connecting hole 530 advances, not only the linear position mode of the adjacent link bodies cannot be reliably maintained without backlash, but also a form of the adjacent link bodies cannot be smoothly changed from a linear position mode to a bending position mode or from a bending position mode to a linear position mode. Further, endurance due to the connecting pin 520 and the pin connecting hole 530 cannot be sufficiently ensured.

Accordingly, problems to be solved by the invention that is the objects of the present invention are to solve the prior art problems and is to provide a cable or the like protection and guide device, which reliably maintains linear position mode of the adjacent connecting link bodies without backlash to remove distortion and can attain a smooth change of form between the linear position mode and the bending position mode, and also can exert endurance due to the connecting pin and the pin connecting hole for a long period of time.

Means for Solving the Problems

The invention according to claim 1 solves the above-mentioned problems by a cable or the like protection and guide device having a number of link bodies in each of which connecting rods are provided in a laterally bridged manner, at an upper edge portion and a lower edge portion of a pair of the right and left side plates, in which a position limiting concave portion provided on one of side plates which connects said link plate on the front and rear sides together with each other and a position limiting convex portion provided on the other side plates are rotatably connected between a linear position mode and a bending position mode through a connecting pin, which is a bending center point in an overlapped manner in the plate thickness direction, and a cable or the like is protected and guided in a cable or the like accommodating space formed in the connected plural link bodies, characterized in that the position limiting concave portion of said side plate includes a pair of abutting surfaces disposed in parallel with a reference line passing through the bending center points of the connecting pins disposed on the front and rear sides of said link body, the position limiting convex portion of said side plate includes a pair of linear position limiting surfaces disposed in parallel with each other in a plane symmetry with respect to said bending center point, and the linear position mode of said link bodies is maintained by surface contact conditions where said abutting surface and said linear position limiting surface are opposed to each other.

And the cable or the like protection and guide device according to claim 2 further solves the above-mentioned problems by, in addition to the configuration of the invention according to claim 1, that said position limiting convex portion includes a bending position limiting surface which is inclined in accordance with a largest bending angle of the link body with respect to said linear position limiting surface.

Further, the cable or the like protection and guide device according to claim 3 further solves the above-mentioned problems by, in addition to the configuration of the invention according to claim 2, that said linear position are continuously formed through an arc plane whose radius is a minimum distance from said bending center point to said abutting surface.

It is noted that the connecting pin in the present invention may be provided in any one of the position limiting concave portion and the position limiting convex portion in the longitudinal direction of the side plate. Even if the connecting pin is provided in any one of them, a basic action and effect are not different from each other.

EFFECTS OF THE INVENTION

The cable or the like protection and guide device according to the present invention has a number of link bodies in each of which connecting plates are provided, in a laterally bridged manner, at an upper edge portion and a lower edge portion of a pair of the right and left side plates, in which a position limiting concave portion provided on one of side plates which connects said link plate on the front and rear sides together with each other and a position limiting convex portion provided on the other side plates are rotatably connected between a linear position mode and a bending position mode through a connecting pin, which is a bending center point in an overlapped manner in the plate thickness direction, and a cable or the like can be protected and guided in a cable or the like accommodating space formed in the connected plural link bodies.

Particularly, in the invention according to claim 1, the position limiting concave portion of said side plate includes a pair of abutting surfaces disposed in parallel to a reference line passing through the bending center point of the connecting pin disposed on the front and rear sides of said link body, said abutting surfaces being in parallel to each other, the position limiting convex portion of said side plate includes a pair of linear position limiting surfaces disposed in a plane symmetry with respect to said bending center point, said abutting surfaces being in parallel to each other, and the linear position mode of said link bodies can be maintained by surface contact conditions where said abutting surface and said linear position limiting surface are opposed to each other. Thus, even if the cable or the like protection and guide device of the present invention receives vibration in a linear position mode of the adjacent connecting link bodies, the device reliably maintains the linear position mode without backlash and distortion of the linear position mode can be removed. Further, a load for maintaining a position is not applied to a connecting pin and a pin connecting hole, which form bending center points in the link body and the connecting pin and the pin connecting hole do not wear. Even if the wear of the connecting pin or pin connecting hole or both of them advances due to repeated bending, a linear position mode is maintained in a two-points supporting mode in only a linear position limiting surface. Accordingly, endurance of the device relating to the connecting pin and the pin connecting hole can be exerted for a long period of time.

And in the cable or the like protection and guide device according to claim 2, in addition to the effects of the invention according to claim 1 exerts, said position limiting convex portion includes a bending position limiting surface which is inclined in accordance with a largest bending angle of the link body with respect to said linear position limiting surface. Accordingly, a load is received by an abutting surface and a bending position limiting surface even in a bending position mode and excess load is not applied to the connecting pin and the pin connecting hole forming a bending center point. Thus, the wear of the connecting pin and the pin connecting hole can be further decreased and excellent endurance and reliability can be exerted.

Further, in the cable or the like protection and guide device according to claim 3, in addition to the effects of the invention according to claim 2 exerts, said linear position are continuously formed through an arc plane whose radius is a minimum distance from said bending center point to said abutting surface. Accordingly, since the linear position limiting surface and the bending position limiting surface, which abut on an abutting surface, can be transferred to each other through an arc surface smoothly, a smooth change of form between the linear position limiting surface and the bending position limiting surface can be attained.

In an embodiment of the present invention a position limiting concave portion formed on a side plate includes a pair of abutting surfaces composed of flat surfaces parallel to a reference line passing through the front and rear bending center points in the link body, and a position limiting convex portion formed on a side plate includes a pair of linear position limiting surfaces composed of flat surfaces parallel to the reference line. Although the link body including such a position limiting concave portion and a position limiting convex portion are connected to each other by a connecting pin and a pin connecting hole, the connecting pin in this case is disposed on the position limiting convex portion of the side plate and the pin connecting hole fitted to this connecting pin is disposed in the position limiting concave portion of the side plate.

In another embodiment of the present invention a position limiting concave portion formed on a side plate includes a pair of abutting surfaces composed of flat surfaces parallel to a reference line passing through the front and rear bending center points in the link body, and a position limiting convex portion formed on a side plate includes a pair of linear position limiting surfaces composed of flat surfaces parallel to the reference line. Although the link body including such a position limiting concave portion and a position limiting convex portion are connected to each other by a connecting pin and a pin connecting hole, the connecting pin in this case is disposed in the position limiting concave portion of the side plate and the pin connecting hole fitted to this connecting pin is disposed on the position limiting convex portion of the side plate.

A better understanding of the invention will be had when reference is made to the BRIEF DESCRIPTION OF THE DRAWINGS, DESCRIPTION OF THE INVENTION and CLAIMS which follow hereinbelow.

A better understanding of the invention will be had when reference is made to the DESCRIPTION OF THE INVENTION and CLAIMS which follow hereinbelow.

DESCRIPTION OF THE INVENTION

EXAMPLE

A cable or the like protection and guide device, which is one example of the present invention, will be described with reference to drawings.

Figure 1:
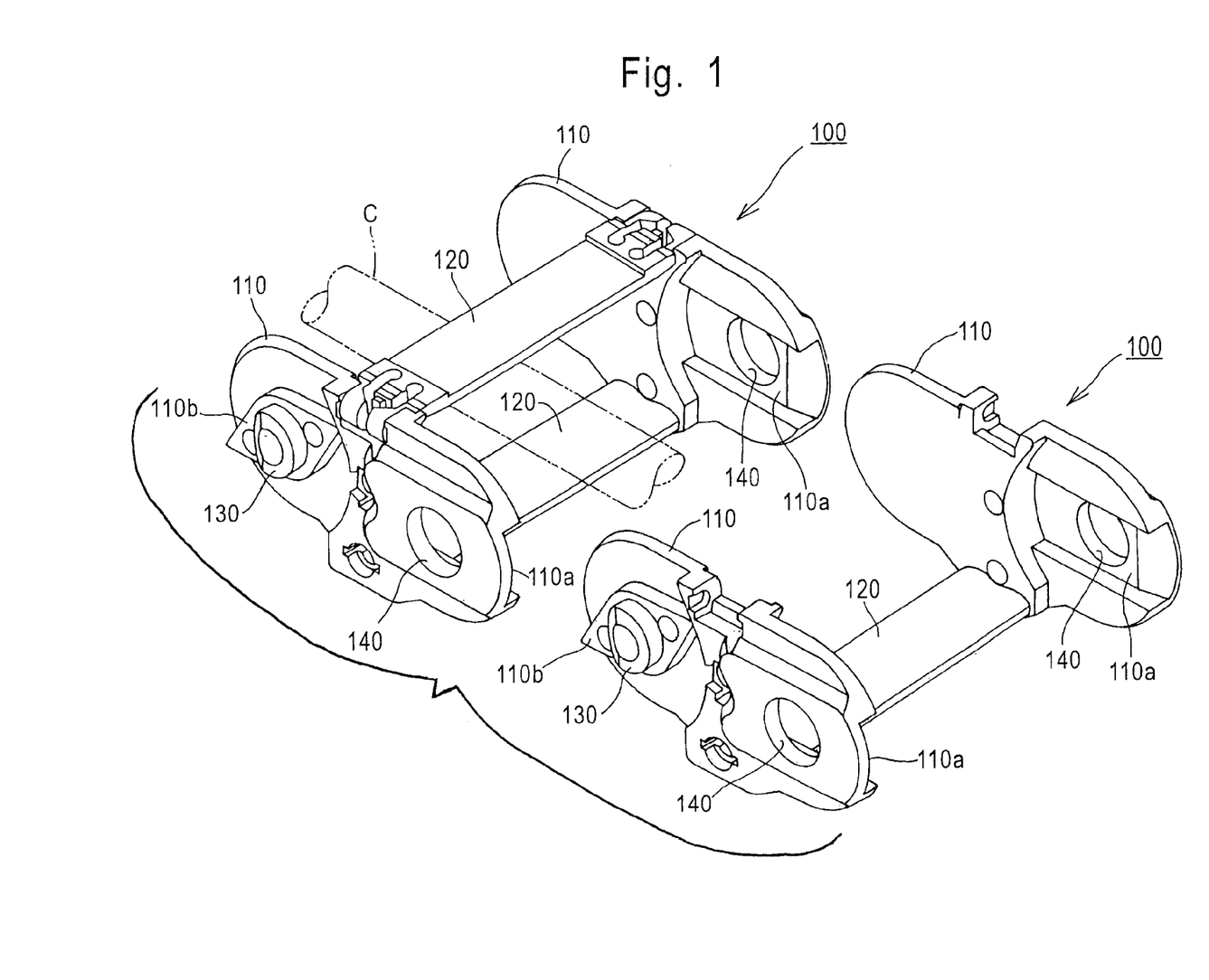
FIG. 1 is an exploded perspective view of a cable or the like protection and guide device, which is a first example of the present invention.
Figure 2:
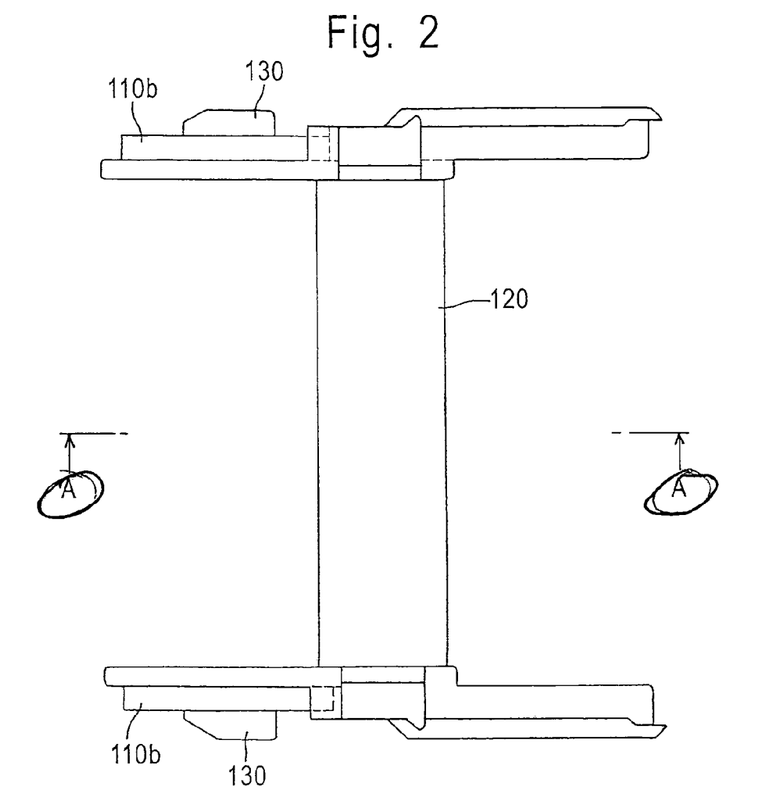
FIG. 2 is a plan view of a link body forming the cable or the like protection and guide device shown in FIG. 1.
Figure 3:
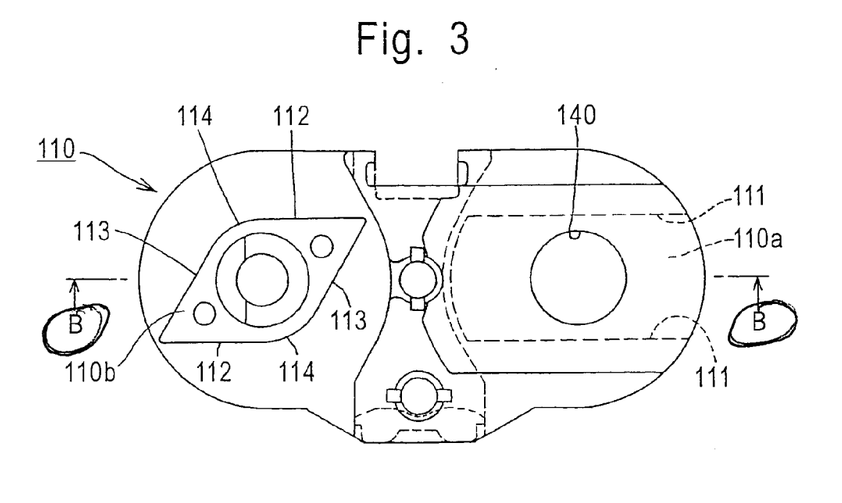
FIG. 3 is a side view of the link body shown in FIG. 2.
Figure 4:
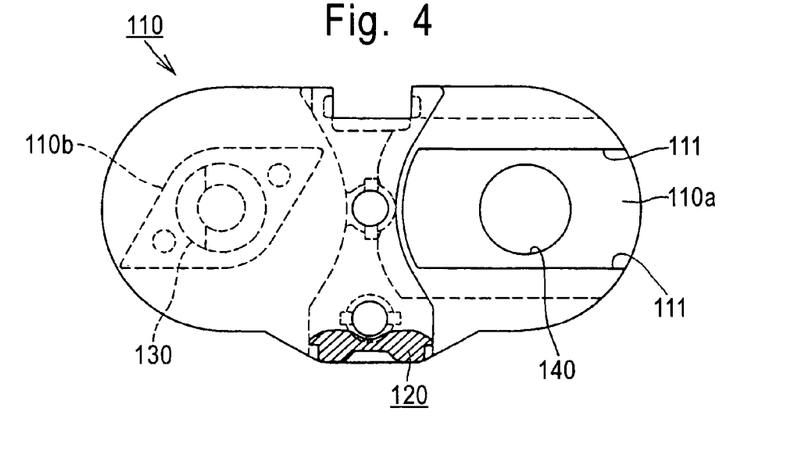
FIG. 4 is a longitudinal cross-sectional view taken along the line 4—4 in FIG. 2.
Figure 5:
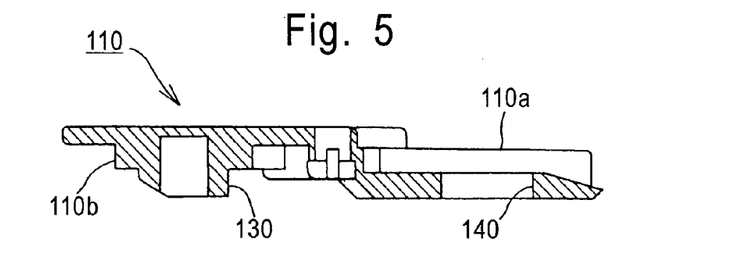
FIG. 5 is a cross-sectional view taken along the line 5—5 in FIG. 4.
Figure 6:
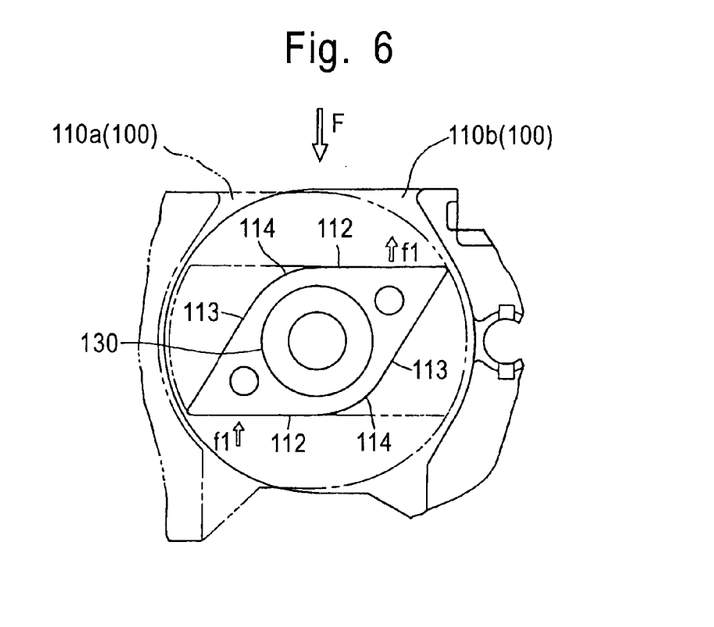
FIG. 6 is an explanatory view showing a connection mode of the link body in the first example.
Figure 7:
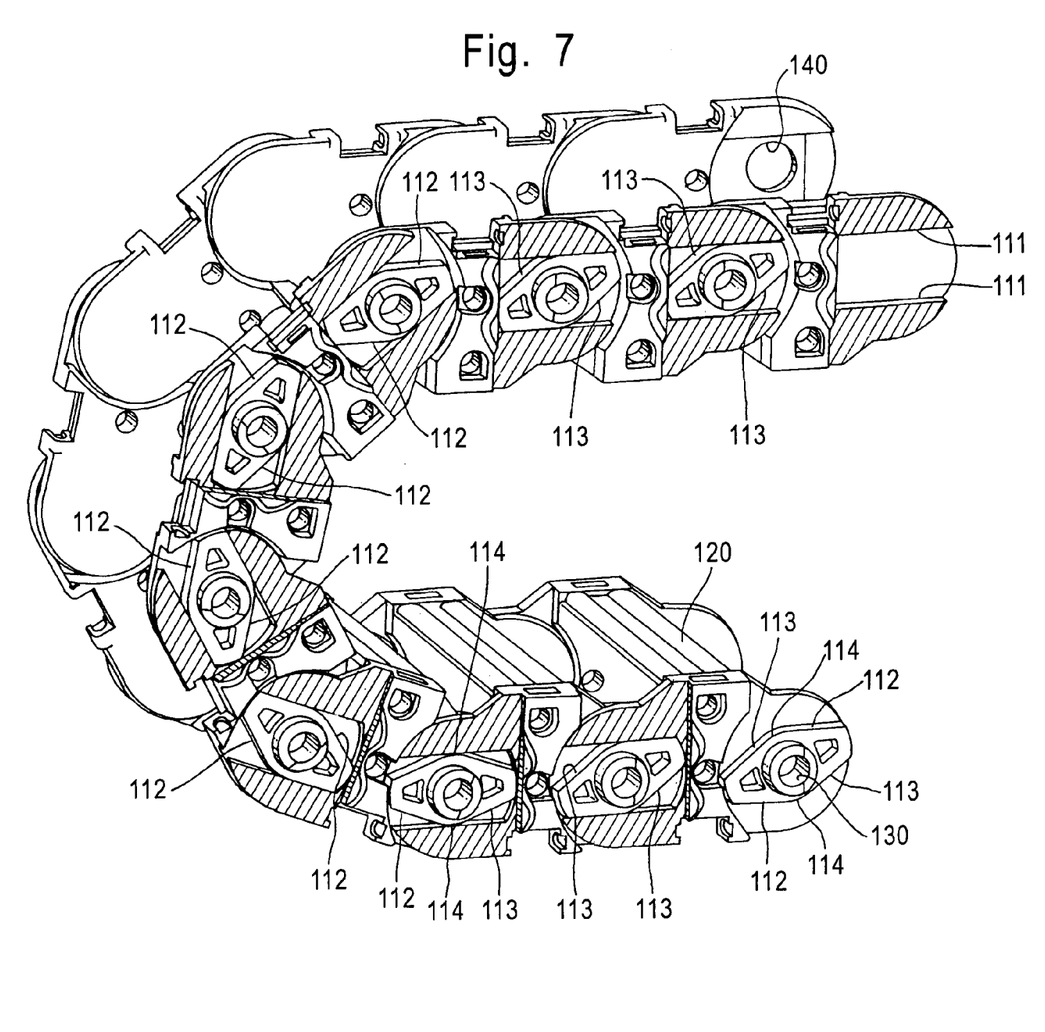
FIG. 7 is a partially cut away perspective view showing a bending mode of the link body in the first example.

FIGS. 1 to 7 are views showing the cable or the like protection and guide device, which is one example of the present invention. Particularly, FIG. 1 is an exploded perspective view of the cable or the like protection and guide device, which is one example of the present invention, FIG. 2 is a plan view of a link body shown in FIG. 1, FIG. 3 is a side view of the link body shown in FIG. 2, FIG. 4 is a longitudinal cross-sectional view taken along the line 4—4 in FIG. 2, FIG. 5 is a cross-sectional view taken along the line 5—5 in FIG. 4, FIG. 6 is an explanatory view showing a connection mode of the link body and FIG. 7 is a partially cut away perspective view showing a bending mode of link bodies.

This cable or the like protection and guide device includes, as shown in FIGS. 1 to 5, synthetic resin link bodies in each of which connecting rods 120, 120 are laterally bridged on the upper edges and lower edges of a pair of right and left side plates 110, 110, respectively and which are rotatably connected between a linear position mode and a bending position mode through a connecting pin 130, which is a bending center point, in such a manner that the adjacent connected side plates 110 are mutually overlapped in a direction of plate thickness direction.

It is noted that although not shown a movable end fitting is connected to each of the front ends of a plurality of connected link bodies and a fixed end fitting is connected to each of the rear ends thereof.

For example, when the cable or the like protection and guide device of the present example is adapted for connecting an industrial device consisting of a lateral boring machine and its fitments, said movable end fitting is fixed to a movable member such as a main shaft head of the lateral boring machine with a bolt and the fixed end fitting is fixed to a stationary member such as a bed of a lateral boring machine or a column or the like with a bolt.

Further, a movable end fitting side of a cable or the like C consisting of a power source cable, which connects an electric motor in said main shaft head to a power source device, a hose, which connects a nozzle for discharging coolant or cutting liquid on the main shaft head to a tank, which reserves it, is connected to a relating device on a movable member such as a main shaft head of a lateral boring machine or the like. On the other hand, a fixed end fitting side of the cable or the like C is connected to a relating device on a movable member such as a main shaft head of a lateral boring machine or a column or the like.

When the movable member such as a main shaft head of a lateral boring machine or the like is moved linearly, the thus connected plural link bodies 100 perform linear movement and bending movement in accordance with a stroke so that a cable or the like C is protected and guided in a cable or the like accommodating space formed in the connected plural link bodies 100.

An incorporating operation of the cable or the like C into the link bodies 100 is attained by, for example, removing the connecting rods 120 disposed on the bending outer peripheral sides of the all link bodies 100, respectively, inserting a cable or the like C in a cable or the like accommodating space formed of these link bodies 100 and then engaging the connecting rods 120 disposed on the bending outer peripheral side.

Further, on an outside stepped wall surface of said side plate 110 is integrally formed a cylindrical connecting pin 130 and on an inside stepped wall surface thereof is integrally formed a pin connecting hole 140 having an inner diameter slightly larger than the outer diameter of the connecting pin 130. The link bodies, which are connected to each other on the front and rear sides, that is the adjacent link bodies, can be bent about a bending center point composed of their connecting pin 130 and pin connecting hole 140.

And a bending angle between the adjacent connected link bodies 100 that is a rotational angle around the center of the connecting pin 130 is adapted to be limited by a position limiting convex portion 110b around the connecting pin 130 and a position limiting concave portion 110a provided around the pin connecting hole 140.

Thus, a concrete side plate structure for limiting the linear position mode and the bending position mode, which is the most characteristic in the cable or the like protection and guide device of the example, will be described in detail.

First, the side plate 110, which connects the link bodies 100 to each other, is provided with a position limiting concave portion 110a on an inner surface side of one of the adjacent connected link bodies 100, and it is provided with a position limiting convex portion 110b on an outer surface side of the other link body 100.

And said position limiting concave portion 110a includes a pair of abutting surfaces 111, 111, consisting of flat surfaces parallel to each other, and the position limiting concave portion 110a has an elongated groove shape opened on an end side of the link body 100. These abutting surfaces 111, 111 interpose a reference line passing through bending center points of the connecting pins 130 respectively disposed on the front and rear link bodies 100, and are disposed in parallel with this reference line. When the abutting surfaces 111, 111 maintain the linear position mode, they abut on the linear position limiting surfaces 112, 112 of the position limiting convex portion 110b, which will be described later.

Further, said position limiting convex portion 110b includes a pair of linear position limiting surfaces 112, 112, disposed in plane symmetry with respect to a bending center point of the adjacent link bodies 100 and parallel with reference to a reference line passing through these bending center points, and a pair of bending position limiting surfaces 113, 113 consisting of parallel planes, which is indispensable when the bending position mode is maintained. The position limiting convex portion 110b composed of said linear position limiting surfaces 112, 112 and the bending position limiting surfaces 113, 113 exhibits a parallelogram having the same length four sides when viewed from a side of the link body, so that the center of said connecting pin 130 exists at the intersection point of diagonal lines formed in such a parallelogram.

It is noted that the bending position limiting surfaces 113, 113 provided in said link body 100 are inclined at an angle corresponding to the largest bending angle of the link body with respect to the reference line passing through the bending center points.

Further, said linear position limiting surfaces 112, 112 and the bending position limiting surfaces 113, 113 are continuously formed through arc surfaces 114 each of which has a radius, which is the minimum distance from the bending center point to the abutting surface. Thus said arc surface 114 and the connecting pin 130 are concentric, and the linear position limiting surfaces 112, 112 and the bending position limiting surfaces 113, 113 can be smoothly transferred through the arc surfaces 114 with respect to said abutting surfaces 113, 113, whereby a smooth change of form between the linear position mode and the bending position mode can be attained.

Therefore, in the cable or the like protection and guide device of the present example, as shown in FIGS. 6 and 7, the position limiting concave portion 110a is fitted into the position limiting convex portion 110b by the adjacent connected link bodies 100. Then when the adjacent connected link bodies 100 are in a linear position mode, the linear position limiting surfaces 112, 112 of the preceding link body 100 make contact with the abutting surfaces 111, 111 of the following link bodies 100 while facing each other. On the other hand, when the adjacent connected link bodies 100 are in a bending position mode, the bending position limiting surfaces 113, 113 of the preceding link body 100 make contact with the abutting surfaces 111, 111 of the following link bodies 100.

Thus, as shown in FIG. 7, the link bodies which are in a linear position mode do not apply a load on the connecting pin 130 and a pin connecting hole 140 (not shown) of adjacent link bodies 100 because the linear position limiting surfaces 112, 112 make surface contact with abutting surfaces 111, 111 of adjacent connected link bodies 100 to receive all loads in a bending direction from the adjacent connected link bodies 100.

Thus, even if a load or impact in a bending direction is applied to the link bodies receive, the linear position limiting surfaces 112, 112 and abutting surfaces 111, 111 produce a resisting force f1 to their bending stress F (FIG. 6) so that the gap between the connecting pin 130 and the pin connecting hole 140 is not changed and they are not worn.

Further, even if the distance or gap between the connecting pin 130 and the pin connecting hole 140 is changed, since both the linear position limiting surfaces 112, 112 and abutting surfaces 111, 111 produce the resisting force f1 to maintain a linear position mode, bending is not generated in the adjacent connected link bodies 100.

Further, in the cable or the like protection and guide device, the bending position limiting surfaces 113, 113 of bent link bodies 100 makes face-contact with the abutting surfaces 111, 111 of the adjacent connected link bodies 100. Thus even if the bending position limiting surfaces 113, 113 and the abutting surfaces 111, 111 receive a load of the link bodies 100 in a rotational direction, the load of the link bodies 100 in the rotational direction is not applied to the connecting pin 130 and the pin connecting hole 140. Accordingly, the gap between the connecting pin 130 and the pin connecting hole 140 is not changed even in the bending position mode, and wear of the connecting pin 130 and the pin connecting hole 140 is extremely small in addition to the fact that they do not wear even in the linear position mode.

Even if the thus obtained cable or the like protection and guide device of the present example receives vibration in a linear position mode, it reliably maintains the linear position mode without generating backlash whereby bending in the linear position mode can be removed. Further, excessive load is not applied onto the connecting pin 130 and the pin connecting hole 140 forming a bending center point in adjacent link bodies 100. Thus, even if the connecting pin 130 or the pin connecting hole 140 or both of them wears due to repeated bending, since a linear position mode is maintained by two-points supporting mode in only a linear position limiting surface, endurance due to the connecting pin 130 and the pin connecting hole 140 can be exerted for a long period of time. Additionally, since said linear position limiting surfaces 112, 112 and the bending position limiting surfaces 113, 113 are continuously formed through arc surfaces 114, 114 having radiuses of the minimum distances from the bending center point to abutting surfaces 111, 111, respectively, the linear position limiting surfaces 112, 112, which abut on the abutting surfaces 111, 111, and the bending position limiting surfaces 113, 113 can be smoothly transferred to each other through the arc surfaces 114, 114. Thus a smooth change of form between the linear position mode and the bending position mode can be attained and the action and effect are very large.

Figure 8:
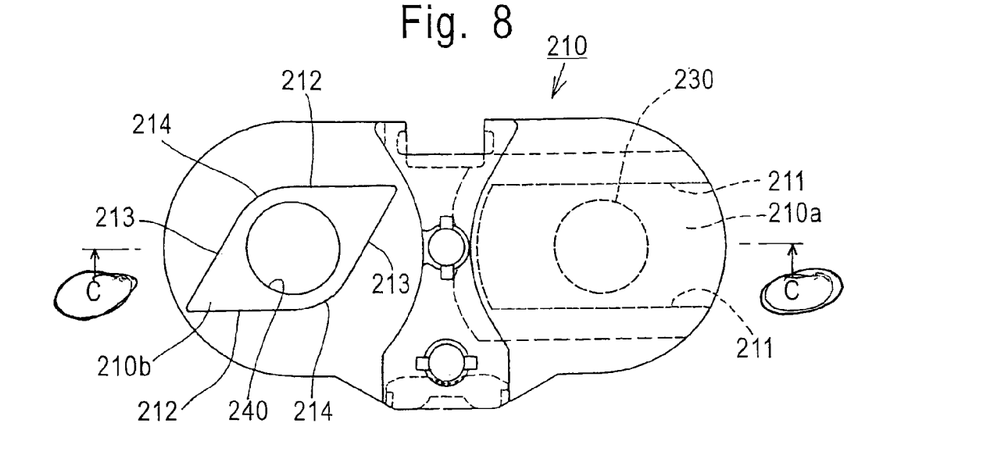
FIG. 8 is a side view of a link body of a cable or the like protection and guide device, which is a second example of the present invention.
Figure 9:
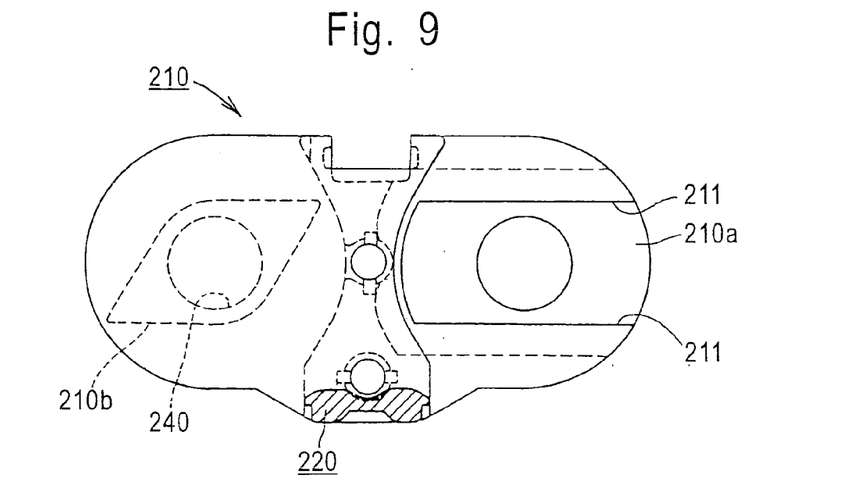
FIG. 9 is a longitudinal cross-sectional view of the link body shown in FIG. 8.
Figure 10:
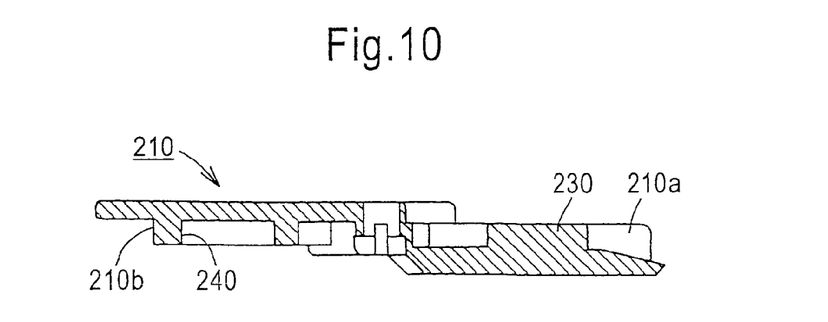
FIG. 10 is a cross-sectional view taken along the line 10—10 in FIG. 9.

FIGS. 8 to 10 show a second example of a cable or the like protection and guide device, which is the present invention.

First, in the cable or the like protection and guide device of the second example shown in FIGS. 8 to 10, a connecting pin 230 is formed in a position limiting concave portion 210a provided on an inside stepped wall surface of a side plate 210 and a pin connecting hole 240 of a blind hole is formed in a position limiting convex portion 210b provided on an outside stepped wall surface of the side plate 210 unlike the cable or the like protection and guide device of the first example shown in FIGS. 1 to 7. In other words, the construction of the device is not changed basically except that the position limiting concave portion 210a is formed around the connecting pin 230, which forms a bending center point of a link body, and the position limiting convex portion 210b is formed around the pin connecting hole 240 into which the connecting pin is fitted. It is noted that reference numeral 220 in FIGS. 8 and 9 denotes a connecting rod laterally bridged on the upper edge and lower edge of a pair of right and left side plates 210, 210.

Thus, the cable or the like protection and guide device of the second example will be described in detail. The bending angle between adjacent connected link bodies that is the rotational angle about the connecting pin 230 is adapted to be limited by the position limiting concave portion 210a around the connecting pin 230 and the position limiting convex portion 210b provided around the pin connecting hole 240.

And said position limiting concave portion 210a includes a pair of abutting surfaces 211, 211, consisting of flat surfaces parallel to each other, and the position limiting concave portion 210a has an elongated groove shape opened on an end side of the link body. These abutting surfaces 211, 211 interpose a reference line passing through bending center points of the connecting pins 230 respectively disposed on the front and rear link bodies, and are disposed in parallel with this reference line. When the abutting surfaces 211, 211 maintain the linear position mode, they abut on the linear position limiting surfaces 212, 212 of the position limiting convex portion 210b, which will be described later.

Further, said position limiting convex portion 210b includes a pair of linear position limiting surfaces 212, 212, disposed in plane symmetry with respect to a bending center point of the adjacent link bodies and parallel with reference to a reference line passing through these bending center points, and a pair of bending position limiting surfaces 213, 213 consisting of parallel planes, which is indispensable when the bending position mode is maintained. The position limiting convex portion 210b composed of said linear position limiting surfaces 212, 212 and the bending position limiting surfaces 213, 213 exhibits a parallelogram having the same length four sides when viewed from a side of the link body, so that the center of said connecting pin 230 exists at the intersection point of diagonal lines formed in such a parallelogram.

It is noted that the bending position limiting surfaces 213, 213 provided in said link body 200 are inclined at an angle corresponding to the largest bending angle of the link body with respect to the reference line passing through the bending center points.

Further, said linear position limiting surfaces 212, 212 and the bending position limiting surfaces 213, 213 are continuously formed through arc surfaces 214 each of which has a radius, which is the minimum distance from the bending center point to the abutting surface. Thus said arc surface 214 and the connecting pin 230 are concentric, and the linear position limiting surfaces 212, 212 and the bending position limiting surfaces 213, 213 can be smoothly transferred through the arc surfaces 214 with respect to said abutting surfaces 213, 213, whereby a smooth change of form between the linear position mode and the bending position mode can be attained.

Therefore, in the cable or the like protection and guide device of the present example, the position limiting concave portion 210a is fitted into the position limiting convex portion 210b by the adjacent connected link bodies. Then when the adjacent connected link bodies are in a linear position mode, the linear position limiting surfaces 212, 212 of the preceding link body make contact with the abutting surfaces 211, 211 of the following link bodies while facing each other. On the other hand, when the adjacent connected link bodies 200 are in a bending position mode, the bending position limiting surfaces 213, 213 of the preceding link body make contact with the abutting surfaces 211, 211 of the following link bodies.

Thus, the link bodies which are in a linear position mode do not apply a load on the connecting pin 230 and a pin connecting hole 240 of adjacent link bodies because the linear position limiting surfaces 212, 212 make surface contact with abutting surfaces 211, 211 of adjacent connected link bodies to receive all loads in a bending direction from the adjacent connected link bodies.

Thus, even if a load or impact in a bending direction is applied to the link bodies receive, the linear position limiting surfaces 212, 212 and abutting surfaces 211, 211 produce a resisting force f1 to their bending stress F so that the gap between the connecting pin 230 and the pin connecting hole 240 is not changed and they are not worn.

Further, even if the distance or gap between the connecting pin 230 and the pin connecting hole 240 is changed, since both the linear position limiting surfaces 212, 212 and abutting surfaces 211, 211 produce the resisting force f1 to maintain a linear position mode, bending is not generated in the adjacent connected link bodies.

Further, in the cable or the like protection and guide device, the bending position limiting surfaces 213, 213 of bent link bodies makes face-contact with the abutting surfaces 211, 211 of the adjacent connected link bodies. Thus even if the bending position limiting surfaces 213, 213 and the abutting surfaces 211, 211 receive a load of the link bodies 200 in a rotational direction, the load of the link bodies in the rotational direction is not applied to the connecting pin 230 and the pin connecting hole 240. Accordingly, the gap between the connecting pin 230 and the pin connecting hole 240 is not changed even in the bending position mode, and wear of the connecting pin 230 and the pin connecting hole 240 is extremely small in addition to the fact that they do not wear even in the linear position mode.

Even if the thus obtained cable or the like protection and guide device of the second example receives vibration in a linear position mode, it reliably maintains the linear position mode without generating backlash whereby bending in the linear position mode can be removed as in the above mentioned cable or the like protection and guide device of the first example. Further, a linear position mode is maintained by two-points supporting mode in only a linear position limiting surface, endurance due to the connecting pin 230 and the pin connecting hole 240 can be exerted for a long period of time. Additionally, the linear position mode and the bending position mode can be smoothly transferred to each other through the arc surfaces 214 and a smooth change of form between the linear position mode and the bending position mode can be attained. Thus the action and effect are very large.

DESCRIPTION OF REFERENCE NUMERALS

100, . . . Link body
110, 210 . . . Side plate
120, 220 . . . Connecting rod
130, 230 . . . Connecting pin
140, 240 . . . Pin connecting hole
110a . . . Position limiting concave portion of side plate 110
110b . . . Position limiting convex portion of side plate 110
111 . . . Abutting surface of position limiting concave portion 110a
112 . . . Linear position limiting surface of position limiting convex portion 110b
113 . . . Bending position limiting surface of position limiting convex portion 110b
114 . . . Arc surface of position limiting convex portion 110b
210a . . . Position limiting concave portion of side plate 210
210b . . . Position limiting convex portion of side plate 210
211 . . . Abutting surface of position limiting concave portion 210a
212 . . . Linear position limiting surface of position limiting convex portion 210b
213 . . . Bending position limiting surface of position limiting convex portion 210b
214 . . . Arc surface of position limiting convex portion 210b
C . . . Cable or the like
F . . . Bending stress
f1, f2 . . . Resisting force While the invention has been described herein by way of examples those skilled in the art will readily recognize that changes may be made to the invention as set forth herein without departing from the spirit and scope of the appended claims.

I claim:

1. A cable protection and guide device having a plurality of rotatably connected link bodies, each of said link bodies includes a pair of right and left side plates, each of said link bodies include connecting rods provided in a laterally bridged manner at an upper edge portion and a lower edge portion of said pair of right and left side plates, each of said side plates includes an interior and an exterior, each of said side plates includes a position limiting concave portion on said interior thereof; each of said side plates includes a position limiting convex portion on said exterior thereof, each of said side plates being rotatably connected between a linear position mode and a bending position mode by a connecting pin and pin hole arrangement with the side plates of the next adjacent link body, and a cable is protected and guided in a cable accommodating space formed in the connected plurality of link bodies, characterized in that said position limiting concave portion of said interior of said side plates includes a pair of abutting surfaces disposed in parallel with each other, said convex portion of said side plate includes a pair of linear position limiting surfaces disposed in parallel with each other and a pair of bending position limiting surfaces disposed in parallel with each other, each of said linear positioning surfaces is coterminous with one of said bending position limiting surfaces such that said linear position limiting surfaces and said bending position limiting surfaces form a substantially parallelogram shape;

said linear position limiting surface of said link bodies is controlled by engagement of said abutting surfaces of said concave portions of said interior of said side plates with said linear position limiting surface of said convex portion of said exterior of said next adjacent side plate.

2. The cable protection and guide device according to claim 1, characterized in that said convex portion of said exterior of said side plate includes a bending position limiting surface inclined to form the largest bending angle of said side plate of said link body with respect to said linear position limiting surface.

3. The cable protection and guide device according to claim 2, characterized in that said abutting surface is located radially close to the connecting pin.

4. The cable protection and guide device according to claim 1 wherein said linear position limiting surfaces and said bending position limiting surfaces are of equal length.

* * * * *

UNITED STATES PATENT AND TRADEMARK OFFICE
CERTIFICATE OF CORRECTION

PATENT NO. : 7,150,206 B2
APPLICATION NO. : 10/871444
DATED : December 19, 2006
INVENTOR(S) : Akihiko Utaki It is certified that error appears in the above-identified patent and that said Letters Patent is hereby corrected as shown below:

In the drawings, Sheet 2, Fig. 2, for the cross-sectional view reference letter "A", each occurrence, should read --4--.

In the drawings, Sheet 2, Fig. 3, for the cross-sectional view reference letter "B", each occurrence, should read --5--.

In the drawings, Sheet 5, Fig. 8, for the cross-sectional view reference letter "C", each occurrence, should read --10--.

Signed and Sealed this

Thirteenth Day of March, 2007

JON W. DUDAS
*Director of the United States Patent and Trademark Office*